(12) United States Patent
Lee et al.

(10) Patent No.: US 9,998,800 B2
(45) Date of Patent: Jun. 12, 2018

(54) 3D BROADCAST SERVICE PROVIDING METHOD AND APPARATUS, AND 3D BROADCAST SERVICE REPRODUCTION METHOD AND APPARATUS FOR USING IMAGE OF ASYMMETRIC ASPECT RATIO

(71) Applicants: Electronics and Telecommunications Research Institute, Daejeon (KR); Hidea Solutions Co., Ltd., Seoul (KR); Kookmin University Industry Academy Cooperation Foundation, Seoul (KR)

(72) Inventors: Joo Young Lee, Daejeon (KR); Sung Hoon Kim, Daejeon (KR); Hyon Gon Choo, Daejeon (KR); Jin Soo Choi, Daejeon (KR); Jin Woong Kim, Daejeon (KR); Suk Jin Hong, Seoul (KR); Jin Suk Kwak, Daejeon (KR); Dong Wook Kang, Seoul (KR); Kyeong Hoon Jung, Seoul (KR)

(73) Assignees: ELECTRONICS AND TELECOMMUNICATIONS RESEARCH INSTITUTE, Daejeon (KR); HIDEA SOLUTIONS CO., LTD., Seoul (KR); KOOKMIN UNIVERSITY INDUSTRY ACADEMY COOPERATION FOUNDATION, Seoul (KR)

( * ) Notice: Subject to any disclaimer, the term of this patent is extended or adjusted under 35 U.S.C. 154(b) by 354 days.

(21) Appl. No.: 14/207,067

(22) Filed: Mar. 12, 2014

(65) Prior Publication Data
US 2014/0320597 A1    Oct. 30, 2014

(30) Foreign Application Priority Data

| Mar. 12, 2013 | (KR) | ......................... 10-2013-0026104 |
| Apr. 15, 2013 | (KR) | ......................... 10-2013-0040835 |
| Mar. 12, 2014 | (KR) | ......................... 10-2014-0028950 |

(51) Int. Cl.
*H04N 13/00* (2018.01)
*H04N 21/81* (2011.01)
(Continued)

(52) U.S. Cl.
CPC ....... *H04N 21/816* (2013.01); *H04N 13/0029* (2013.01); *H04N 13/0066* (2013.01); *H04N 21/21805* (2013.01); *H04N 21/23614* (2013.01)

(58) Field of Classification Search
None
See application file for complete search history.

(56) References Cited

U.S. PATENT DOCUMENTS

2011/0141235 A1* 6/2011 Tsukagoshi .......... H04N 13/007
348/43
2011/0181693 A1* 7/2011 Lee ...................... H04N 19/597
348/43
(Continued)

FOREIGN PATENT DOCUMENTS

WO   WO 2008002759 A2 *  1/2008  ......... H04N 5/44591

*Primary Examiner* — Kate Luo
(74) *Attorney, Agent, or Firm* — Rabin & Berdo, P.C.

(57) ABSTRACT

Disclosed are a method and apparatus for providing a three-dimensional (3D) broadcast service using images with asymmetric aspect ratios and a method and apparatus for reproducing a 3D broadcast service. The method of providing the 3D broadcast service includes adjusting a second viewpoint image to be composed with a first viewpoint image into a 3D form with respect to the first viewpoint image and the second viewpoint image for 3D broadcasting, encoding the first viewpoint image and the adjusted second viewpoint image, and generating a broadcast stream of the first viewpoint image and a broadcast stream of the second (Continued)

viewpoint image by multiplexing the first viewpoint image and the second viewpoint image.

15 Claims, 19 Drawing Sheets

(51) Int. Cl.
*H04N 21/236* (2011.01)
*H04N 21/218* (2011.01)

(56) References Cited

U.S. PATENT DOCUMENTS

| | | | | |
|---|---|---|---|---|
| 2011/0254929 | A1* | 10/2011 | Yang | G02B 27/2264 |
| | | | | 348/51 |
| 2012/0033039 | A1* | 2/2012 | Sasaki | H04N 13/0029 |
| | | | | 348/43 |
| 2012/0229600 | A1* | 9/2012 | Zhang | H04N 13/0018 |
| | | | | 348/43 |
| 2012/0257015 | A1* | 10/2012 | Kim | H04N 13/0059 |
| | | | | 348/43 |
| 2012/0314937 | A1* | 12/2012 | Kim | H04N 13/0033 |
| | | | | 382/154 |
| 2013/0010093 | A1* | 1/2013 | Redmann | H04N 13/0018 |
| | | | | 348/61 |

* cited by examiner

FIG. 5

| Syntax | No. of Bits | Format |
|---|---|---|
| MDTV_Hybrid_Stereoscopic_Service_Descriptor() { | | |
|     descriptor_tag | 8 | uimsbf |
|     descriptor_length | 8 | uimsbf |
|     reserved | 5 | '11111" |
|     stereoscopic_service_type | 3 | bslbf |
|     If (stereoscopic_service_type == "001' ) { | | |
|         MDTV_service_id | 16 | uimsbf |
|         reserved_for_video_enhancement | 3 | '111' |
|         aspect_ratio_adjustment_mode | 3 | bslbf |
|         leftview_flag | 1 | bslbf |
|         offset_sign_bit | 1 | bslbf |
|         timestamp_offset | 32 | uimsbf |
|     } | | |
| } | | |

FIG. 6

| Values | Description |
|---|---|
| '000' | None |
| '001' | Cropped - left and right |
| '010' | Cropped - top and bottom |
| '011' | Letterboxed |
| '100' | Pillarboxed |
| '101' ~ '111' | Reserved |

(a) Aspect Ratio Conversion (b-1) Cropped – left and right (b-2) Cropped – left and right (c-1) Letterboxed (c-2) Letterboxed (c-3) Letterboxed (a) Aspect Ratio Conversion (b-1) Cropped – top and bottom (b-2) Cropped – top and bottom (c-1) Pillarboxed (c-2) Letterboxed (c-3) Pillarboxed

FIG. 19

| Video size (MDTV) | Mobile DTV video processing before compression | Video size (main) | Aspect ratio adjustment processing before 3D presentation |
|---|---|---|---|
| 416x240 | - Scale to 416x234<br>- Add 2 and 4 line bars to top and bottom, respectively | 1920x1080 | Images over Mobile DTV:<br>- Extract the 416x234 active portion (from line 3 to line 236)<br>- Scale to 1920x1080 |
| | | 1280x720 | Images over Mobile DTV:<br>- Extract the 416x234 active portion (from line 3 to line 236)<br>- Scale to 1280x720 |
| | | 704x480 | Images over Mobile DTV:<br>- Extract the 416x234 active portion (from line 3 to line 236)<br>- Scale to 704x480 |
| 640x368 | - Scale to 640x360<br>- Add 4 line bars to each top and bottom | 1920x1080 | Images over Mobile DTV:<br>- Extract the centre 640x360 portion<br>- Scale to 1920x1080 |
| | | 1280x720 | Images over Mobile DTV:<br>- Extract the centre 640x360 portion<br>- Scale to 1280x720 |
| | | 704x480 | Images over Mobile DTV:<br>- Extract the centre 640x360 portion<br>- Scale to 704x480 |
| 832x480 | - Scale to 832x468<br>- Add 6 line bars to each top and bottom | 1920x1080 | Images over Mobile DTV:<br>- Extract the centre 832x468 portion<br>- Scale to 1920x1080 |
| | | 1280x720 | Images over Mobile DTV:<br>- Extract the centre 832x468 portion<br>- Scale to 1280x720 |
| | | 704x480 | Images over Mobile DTV:<br>- Extract the centre 832x468 portion<br>- Scale to 704x480 |

3D BROADCAST SERVICE PROVIDING METHOD AND APPARATUS, AND 3D BROADCAST SERVICE REPRODUCTION METHOD AND APPARATUS FOR USING IMAGE OF ASYMMETRIC ASPECT RATIO

CROSS-REFERENCE TO RELATED APPLICATIONS

This application claims the benefit of Korean Patent Application No. 10-2013-0026104, Korean Patent Application No. 10-2013-0040835, and Korean Patent Application No. 10-2014-0028950, respectively filed on Mar. 12, 2013, Apr. 15, 2013, and Mar. 12, 2014, in the Korean Intellectual Property Office, the disclosures of which are incorporated herein by reference.

TECHNICAL FIELD

The present invention relates to a three-dimensional (3D) broadcast service, and more particularly, to a method of processing a 3D broadcast service of images with asymmetric aspect ratios.

BACKGROUND ART

Stereoscopic three-dimensional (3D) content generally used for 3D movies or 3D broadcasts provides distance and depth perceptions through two stereoscopic images. 3D content is perceived when the brain analyzes and integrates stereoscopic images that viewers watch through the eyes. Stereoscopic 3D content may need to provide a natural 3D effect as if viewers see objects with both eyes in the real world.

Here, for a 3D broadcast service, right and left images for 3D broadcasting need transmitting. Right and left images generally use the same video format, while right and left images may have different aspect ratios in formats in hybrid 3D broadcasting in which the right and left images are transmitted through heterogeneous broadcast networks. When a 3D service is provided regardless of disagreeing aspect ratios, formats of the left and right images present on a display may have different aspect ratios, and such difference may bring about inconvenience to a user watching a 3D broadcast. Accordingly, there is needed a processing method for providing a user with a hybrid 3D broadcast using transmission formats of left and right images with different aspect ratios so that the user perceives a natural 3D effect.

In particular, to provide a stereoscopic 3D broadcast service, two different images from different viewpoints, right and left images, may need transmitting. In this case, the right and left images may generally have the same aspect ratio in terms of transmission format and display. However, in a hybrid 3D broadcast service in which one of the two viewpoint images is transmitted through a terrestrial 2D broadcast network and the other one is transmitted through a different broadcast network of a mobile network, a broadband network or a satellite network, the two viewpoints images may have different aspect ratios relating to transmission format and display due to different broadcast standards. These different aspect ratios may cause serious inconvenience to a user watching a composed 3D image, and accordingly a way of resolving this problem is needed.

DISCLOSURE OF INVENTION

Technical Goals

An aspect of the present invention provides an apparatus and a method for providing a 3D broadcast with a natural 3D effect by adjusting one of right and left images having different aspect ratios relating to transmission format and to display to be composed with the other image into a 3D image.

Another aspect of the present invention also provides an apparatus and a method for providing a 3D broadcast with a natural 3D effect by adaptively adjusting one of right and left images based on a difference in aspect ratio between the right and left images.

Technical Solutions

According to an aspect of the present invention, there is provided a method of providing a three-dimensional (3D) broadcast service, the method including adjusting a second viewpoint image to be composed with a first viewpoint image into a 3D form with respect to the first viewpoint image and the second viewpoint image for 3D broadcasting, encoding the first viewpoint image and the adjusted second viewpoint image, and generating a broadcast stream of the first viewpoint image and a broadcast stream of the second viewpoint image by multiplexing the first viewpoint image and the second viewpoint image.

The method may further include inserting aspect ratio adjustment information used for adjusting the second viewpoint image into the broadcast stream of the second viewpoint image.

The adjusting may adjust the second viewpoint image by applying aspect ratio conversion to the second viewpoint image.

The adjusting may adjust the second viewpoint image by applying cropping to the second viewpoint image.

The adjusting may adjust the second viewpoint image by applying letterboxing to the second viewpoint image.

The adjusting may adjust the second viewpoint image by applying pillarboxing to the second viewpoint image.

According to another aspect of the present invention, there is provided a method of providing a 3D broadcast service, the method including adjusting a second viewpoint image to be composed with a first viewpoint image into a 3D form when the first and second viewpoint images for 3D broadcasting have different aspect ratios relating to transmission formats, encoding the first viewpoint image and the adjusted second viewpoint image, generating a broadcast stream of the first viewpoint image and a broadcast stream of the second viewpoint image by multiplexing the first viewpoint image and the second viewpoint image, and inserting aspect ratio adjustment information used for adjusting the second viewpoint image into the broadcast stream of the second viewpoint image The adjusting may adjust the second viewpoint image by applying cropping to the second viewpoint image.

The adjusting may adjust the second viewpoint image by applying letterboxing to the second viewpoint image.

The adjusting may adjust the second viewpoint image by applying pillarboxing to the second viewpoint image.

According to still another aspect of the present invention, there is provided a method of reproducing a 3D broadcast service, the method including receiving a broadcast stream of a first viewpoint image and a broadcast stream of a second viewpoint image, demultiplexing the broadcast stream of the first viewpoint image and the broadcast stream of the second viewpoint image to extract the first viewpoint image, the second viewpoint image and aspect ratio adjustment information applied to the second viewpoint image, decoding the first viewpoint image and the adjusted second viewpoint image, adjusting the second viewpoint image using the aspect ratio adjustment information so that the decoded second viewpoint image is composed with the first viewpoint image into a 3D form, and composing the first viewpoint image and the second viewpoint image to generate a 3D broadcast image.

The adjusting may adjust the second viewpoint image by applying aspect ratio conversion to the second viewpoint image.

The adjusting may apply cropping to the first viewpoint image to match the second viewpoint image.

The adjusting may adjust the second viewpoint image by removing a letterboxing bar from the second viewpoint image.

The adjusting may adjust the second viewpoint image by removing a pillarboxing bar from the second viewpoint image.

According to yet another aspect of the present invention, there is provided an apparatus for providing a 3D broadcast service, the apparatus including an image adjusting unit to adjust a second viewpoint image to be composed with a first viewpoint image into a 3D form with respect to the first viewpoint image and the second viewpoint image for 3D broadcasting, an image encoding unit to encode the first viewpoint image and the adjusted second viewpoint image, a multiplexing unit to generate a broadcast stream of the first viewpoint image and a broadcast stream of the second viewpoint image by multiplexing the first viewpoint image and the second viewpoint image, and an information inserting unit to insert aspect ratio adjustment information used for adjusting the second viewpoint image into the broadcast stream of the first viewpoint image or the broadcast stream of the second viewpoint image.

The image adjusting unit may adjust the second viewpoint image by applying one of aspect ratio conversion, cropping, pillarboxing and letterboxing to the second viewpoint image so that the second viewpoint image is composed with the first viewpoint image into a 3D form.

According to still another aspect of the present invention, there is provided an apparatus for providing a 3D broadcast service, the apparatus including an image adjusting unit to adjust a second viewpoint image to be composed with a first viewpoint image into a 3D form when the first and second viewpoint images for 3D broadcasting have different aspect ratios relating to transmission formats, an image encoding unit to encode the first viewpoint image and the adjusted second viewpoint image, a multiplexing unit to generate a broadcast stream of the first viewpoint image and a broadcast stream of the second viewpoint image by multiplexing the first viewpoint image and the second viewpoint image, and an information inserting unit to insert aspect ratio adjustment information used for adjusting the second viewpoint image into the broadcast stream of the first viewpoint image or the broadcast stream of the second viewpoint image.

The image adjusting unit may adjust the second viewpoint image by applying one of aspect ratio conversion, cropping, pillarboxing and letterboxing to the second viewpoint image so that the second viewpoint image is composed with the first viewpoint image into a 3D form.

According to yet another aspect of the present invention, there is provided an apparatus for reproducing a 3D broadcast service, the apparatus including a stream reception unit to receive a broadcast stream of a first viewpoint image and a broadcast stream of a second viewpoint image, an image extracting unit to demultiplex the broadcast stream of the first viewpoint image and the broadcast stream of the second viewpoint image to extract the first viewpoint image, the second viewpoint image and aspect ratio adjustment information applied to the second viewpoint image, an image decoding unit to decode the first viewpoint image and the adjusted second viewpoint image, an image adjusting unit to adjust the second viewpoint image using the aspect ratio adjustment information so that the decoded second viewpoint image is composed with the first viewpoint image into a 3D form, and an image composing unit to compose the first viewpoint image and the second viewpoint image to generate a 3D broadcast image.

Effect

According to embodiments of the present invention, it is possible to provide a 3D broadcast with a natural 3D effect by adjusting one of the images, although right and left images have different aspect ratios.

Additionally, according to embodiments of the present invention, it is possible to provide a 3D broadcast with a natural 3D effect by adaptively adjusting one of right and left images based on a difference in aspect ratio between the right and left images.

BRIEF DESCRIPTION OF DRAWINGS

These and/or other aspects, features, and advantages of the invention will become apparent and more readily appreciated from the following description of embodiments, taken in conjunction with the accompanying drawings of which:

FIG. 5 illustrates an example of signaling aspect ratio adjustment information according to an embodiment;

FIG. 6 illustrates an example of aspect ratio adjustment information in detail according to an embodiment;

FIG. 19 illustrates an example of adjusting a second viewpoint image for a 3D broadcast service according to an embodiment.

DETAILED DESCRIPTION OF THE INVENTION

Hereinafter, embodiments of the present invention will be described in detail with reference to the accompanying drawings.

Figure 1:
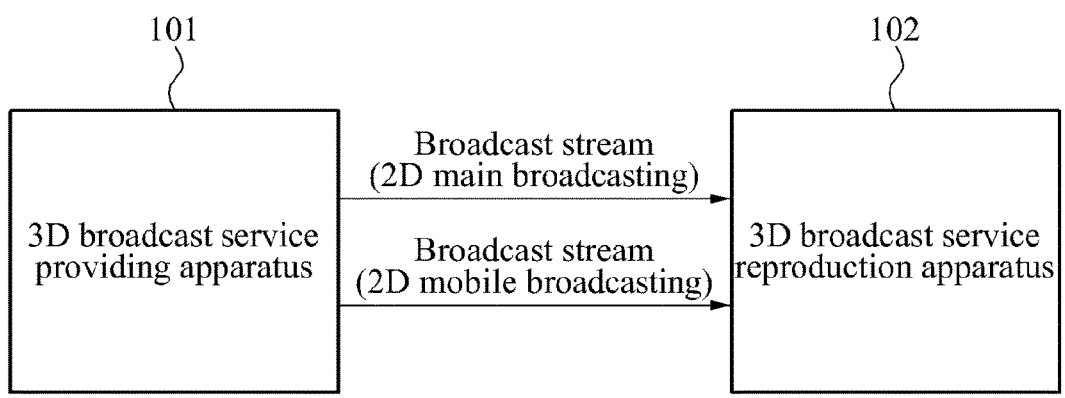
FIG. 1 is a diagram illustrating operations of a three-dimensional (3D) broadcast service providing apparatus and a 3D broadcast service reproduction apparatus according to an embodiment.

FIG. 1 is a diagram illustrating operations of a three-dimensional (3D) broadcast service providing apparatus and a 3D broadcast service reproduction apparatus according to an embodiment.

Referring to FIG. 1, the 3D broadcast service providing apparatus 101 may transmit a broadcast stream to the 3D broadcast service reproduction apparatus 102. Here, the 3D broadcast service providing apparatus 101 may include a broadcast stream including images from two different viewpoints ("two different viewpoint images"). For instance, an image from one viewpoint ("one viewpoint image") is related to an Advanced Television Systems Committee (ATSC) main service and may be encoded according to Moving Picture Expert Group (MPEG)-2. An image from another viewpoint ("another viewpoint image") is related to an ATSC mobile service and may be encoded according to advanced video coding (AVC). The two different viewpoint images forming a 3D broadcast service are not limited to the foregoing characteristics.

The two different viewpoint images may be transmitted through two independent video streams. Here, the one viewpoint image may be suitable for a legacy 2D broadcasting service, while the other viewpoint image may be suitable for an ATSC mobile broadcasting service.

The broadcast stream transmitted from the 3D broadcast service providing apparatus 101 to the 3D broadcast service reproduction apparatus 102 may include encoded left and right images. That is, the broadcast stream may include encoded different viewpoint images. Here, when the left and right images have different aspect ratios relating to transmission format, the 3D broadcast service providing apparatus 101 may adjust one of the viewpoint images to be composed with the other viewpoint image into a 3D image. Accordingly, the 3D broadcast service providing apparatus 101 enables the right and left images to have the same aspect ratio relating to display.

Here, the aspect ratios relating to transmission format correspond to aspect ratios in accordance with standards of image formats transmitted through legacy 2D or ATSC mobile broadcast networks, and the aspect ratio relating to display corresponds to an aspect ratio relating to a form of actually presenting an active area to viewers. The active area is a region of transmitted images excluding bars in letter-boxing or pillarboxing, in which the left and right images are actually composed for a 3D broadcast service.

In one embodiment, a 3D broadcast service may be provided using viewpoint images, left and right images, having asymmetric aspect ratios relating to transmission format. Here, the left image and the right image are transmitted through different streams. In detail, the left image may be transmitted through a 2D stationary broadcast network, while the right image may be transmitted through a mobile broadcast network. The left image may be encoded for transmission into a high-definition (HD) broadcast stream, while the right image may be encoded for transmission into a standard-definition (SD) bitstream.

An image dimension may change based on broadcast standards. For example, a transmission format of the left image may have a dimension of 1920×1080 with an aspect ratio of 16:9, and a transmission format of the right image may have a dimension of 416×240 with an aspect ratio of 15.6:9. As an aspect ratio of 16:9 is generally used for digital broadcasting, the following embodiment supposes that an original image input to an encoder has an aspect ratio of 16:9.

Then, the left image for 2D stationary broadcasting using an aspect ratio of 16:9 has the same aspect ratio of 16:9 relating to both transmission format and display, and thus does not involve an additional process of aspect ratio conversion. However, the right image for mobile broadcasting using an aspect ratio of 15.6:9 may need an image adjusting process to match the left image with the aspect ratio of 16:9 for a 3D broadcast service. Various methods may be used to adjust the right image, in which signaling an adjusting method may be requested.

Figure 2:
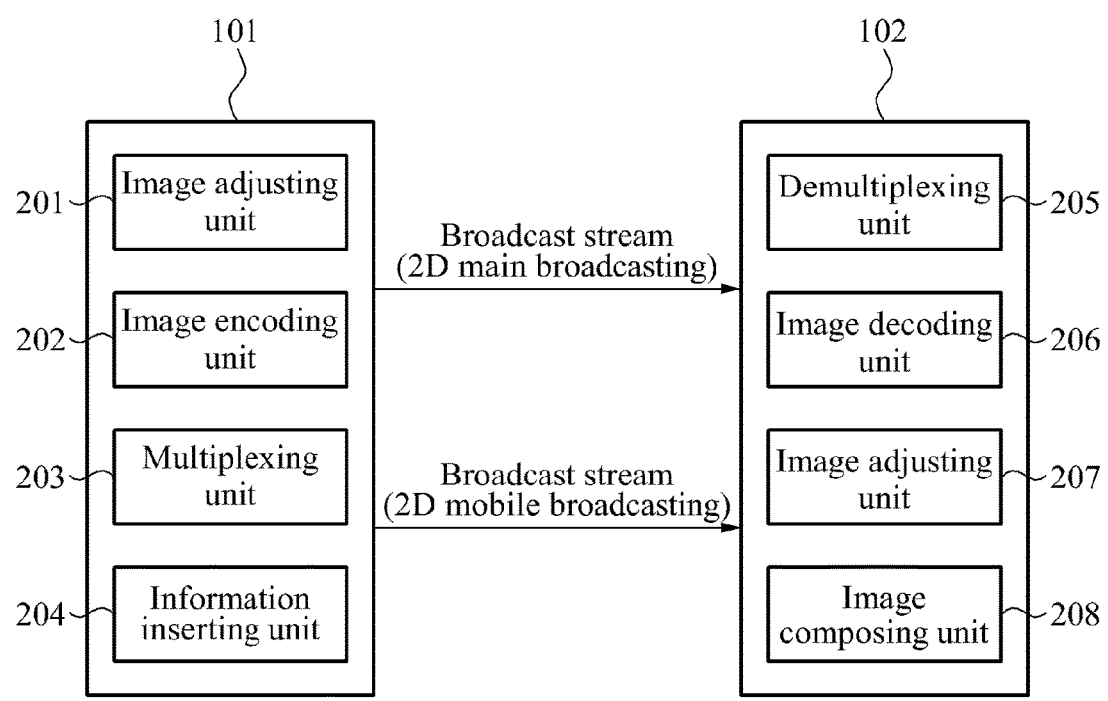
FIG. 2 is a diagram illustrating detailed configurations of the 3D broadcast service providing apparatus and the 3D broadcast service reproduction apparatus according to an embodiment.

FIG. 2 is a diagram illustrating detailed configurations of the 3D broadcast service providing apparatus and the 3D broadcast service reproduction apparatus according to an embodiment.

Referring to FIG. 2, the 3D broadcast service providing apparatus 101 may include an image adjusting unit 201, an image encoding unit 202, a multiplexing unit 203 and an information inserting unit 204.

The image adjusting unit 201 may adjust a second viewpoint image to be composed with a first viewpoint image into a 3D image, regarding the first viewpoint image and the second viewpoint image for 3D broadcasting. The first viewpoint image and the second viewpoint image may be left and right images for a 3D broadcast service. Here, when the first viewpoint image and the second viewpoint image have different aspect ratios relating to image transmission format, the image adjusting unit 201 may adjust the second viewpoint image to be composed with the first viewpoint image into a 3D form. A process of adjusting the image will be described in detail with reference to FIGS. 3 and 4.

For instance, the image adjusting unit 201 may adjust the second viewpoint image by applying aspect ratio conversion to the second viewpoint image. Here, aspect ratio conversion may refer to a process of suitably converting an aspect ratio of an input image to an aspect ratio relating to transmission format before encoding. Alternatively, the image adjusting unit 201 may adjust the second viewpoint image by applying cropping to the second viewpoint image. Also, the image adjusting unit 201 may adjust the second viewpoint image by applying letterboxing to the second viewpoint image. In addition, the image adjusting unit 201 may adjust the second viewpoint image by applying pillarboxing to the second viewpoint image.

The image encoding unit 202 may encode the original first viewpoint image and the adjusted second viewpoint image. The first viewpoint image and the second viewpoint image may be encoded according to a codec used in broadcast standards. For example, an MPEG-4 AVC codec used in an ATSC A/153 mobile broadcast standard may be used. Alternatively, diverse image compression methods, such as an MPEG-2 image codec and an HEVC codec, may be used.

The multiplexing unit 203 may multiplex the encoded first viewpoint image and second viewpoint image to generate a broadcast stream of the first viewpoint image and a broadcast stream of the second viewpoint image. For instance, the multiplexing unit 203 may multiplex the first viewpoint image and the second viewpoint image in accordance with broadcast standards.

For example, according to the ATSC A/153 standard, the first viewpoint image in a stationary 2D broadcast stream, and the second viewpoint image in a mobile broadcasting stream may be multiplexed into an MPEG-2 TS. Alternatively, the first viewpoint image may be multiplexed into a broadcast stream according to Digital Video Broadcasting-Second Generation Terrestrial (DVB-T2), while the second viewpoint image may be multiplexed into a broadcast stream according to DVB-T2 Lite. Alternatively, the first viewpoint image may be multiplexed into a broadcast stream according to Integrated Services Digital Broadcasting (ISDB), while the second viewpoint image may be multiplexed into a broadcast stream according to One-Seg. In addition, various broadcast standards may be used for stream multiplexing.

The information inserting unit 204 may insert aspect ratio adjustment information used for adjusting the second viewpoint image into the broadcast stream of the first viewpoint image or the broadcast stream of the second viewpoint image, thereby signaling information on aspect ratio adjustment. When the aspect ratio adjustment information means a descriptor representing an aspect ratio adjustment mode related to adjustment of the second viewpoint image, the aspect ratio adjustment information may be inserted into the broadcast bitstream of the first viewpoint image. Here, the aspect ratio adjustment mode indicates by which method the aspect ratio of the second viewpoint image is adjusted. Meanwhile, when the aspect ratio adjustment information means Active Format Description (AFD) or bar data information used for adjusting the aspect ratio of the second viewpoint image, the aspect ratio adjustment information may be inserted into the broadcast bitstream of the second viewpoint image.

The aspect ratio adjustment information may be inserted by a different method based on a signaling standard of broadcast standards. For instance, the aspect ratio adjustment information may be inserted as a descriptor into the broadcast stream of the first viewpoint image. In this case, the aspect ratio adjustment information may be transmitted as a signaling descriptor of a program map table (PMT), a virtual channel table (VCT), an event information table (EIT) and service information (SI) in a transport level periodically transmitted via an MPEG-2 TS packet.

Alternatively, the aspect ratio adjustment information may be transmitted through another signaling channel, such as a fast information channel (FIC) according to the A/153 standard and a service level descriptor and a component level descriptor of a service map table (SMT). The aspect ratio adjustment information may be also transmitted via a video level, instead of a transport level. In this case, different transmission methods may be employed depending on video standards. For example, an MPEG-2 video may be transmitted through user data of a video frame header. An AVC video may include aspect ratio adjustment information in a video stream through a supplemental enhancement information (SEI) message.

When the second viewpoint image is adjusted by letterboxing or pillarboxing, the information inserting unit 204 may signal presence of a bar to the broadcast stream of the second viewpoint image using AFD stipulated in video standards of A/153 or using bar data information.

The 3D broadcast service reproduction apparatus 102 may include a demultiplexing unit 205, an image decoding unit 206, an image adjusting unit 207 and an image composing unit 208.

The demultiplexing unit 205 may receive and demultiplex the broadcast streams of the first viewpoint image and the second viewpoint image from the 3D broadcast service providing apparatus 101. Here, the demultiplexing unit 205 may demultiplex the broadcast streams of the first viewpoint image and the second viewpoint image to extract the first viewpoint image, the second viewpoint image and the aspect ratio adjustment information applied to the second viewpoint image.

Here, demultiplexing the broadcast streams may be carried out in view of a broadcast standard employed for multiplexing. For example, the demultiplexing unit 205 may demultiplex MPEG-2 TS including the first viewpoint image in a stationary 2D broadcast stream and the second viewpoint image in a mobile broadcasting stream.

Alternatively, the demultiplexing unit 205 may demultiplex the broadcast stream of the first viewpoint image multiplexed according to DVC-T2 or demultiplex the broadcast stream of the second viewpoint image multiplexed according to DVB-T2 Lite. Also, the demultiplexing unit 205 may demultiplex the broadcast stream of the first viewpoint image multiplexed according to ISDB or demultiplex the broadcast stream of the second viewpoint image multiplexed according to One-Seg. In addition, the demultiplexing unit 205 may demultiplex broadcast streams multiplexed according to various broadcast standards.

Further, the demultiplexing unit 205 may demultiplex the broadcast stream of the second viewpoint image to extract the aspect ratio adjustment information used for adjusting the second viewpoint image. The aspect ratio adjustment information may be extracted by a different method based on a signaling method of broadcast standards. For instance, the demultiplexing unit 205 may extract, from the broadcast stream of the first viewpoint image, the aspect ratio adjustment information as a signaling descriptor of a PMT, a VCT, an EIT and SI in a transport level periodically transmitted via an MPEG-2 TS packet. Alternatively, the aspect ratio adjustment information may be extracted through a signaling channel, such as an FIC according to the A/153 standard and a service level descriptor and a component level descriptor of an SMT.

The aspect ratio adjustment information may be also extracted via a video level, instead of a transport level. In this case, different extraction methods may be employed depending on video standards. For example, when a broadcast stream includes a viewpoint image encoded by MPEG-2, the demultiplexing unit 205 may extract aspect ratio adjustment information through user data of a video frame header. When a broadcast stream includes a viewpoint image encoded by AVC, the demultiplexing unit 205 may extract aspect ratio adjustment information through an SEI message.

Further, when the second viewpoint image is adjusted by letterboxing or pillarboxing, the aspect ratio adjustment information may be extracted using AFD stipulated in video standards of A/153 or using bar data information.

The image decoding unit 206 may decode the first viewpoint image and the second viewpoint image.

The image decoding unit 206 may consider a codec used for encoding the first viewpoint image and the second viewpoint image in decoding. Here, various codices may be used for encoding. In the present invention, diverse codeces conventionally used in broadcast standards may be selected. For example, an MPEG-4 AVC codec used for ATSC A/153 mobile broadcast standards may be used for decoding. Alternatively, different image codices including MPEG-2 image codec and HEVC may be used for decoding.

The image adjusting unit 207 may adjust the decoded first viewpoint image or second viewpoint image using the aspect ratio adjustment information.

For example, the image adjusting unit 207 may adjust the second viewpoint image by applying aspect ratio conversion to the second viewpoint image. Here, aspect ratio conversion may refer to a process of suitably converting an aspect ratio of an image output from a decoder to an aspect ratio relating to display. The image adjusting unit 207 may apply cropping to the first viewpoint image to generate a first viewpoint image corresponding to the second viewpoint image. Alternatively, the image adjusting unit 207 may apply letterboxing to the second viewpoint image to adjust the second viewpoint image. Also, the image adjusting unit 207 may apply pillarboxing to the second viewpoint image to adjust the second viewpoint image.

The image composing unit 208 may compose the adjusted two viewpoint images into a 3D broadcast image.

Operations of the image adjusting unit 207 and the image composing unit 208 will be described in detail with reference to FIGS. 7 to 18.

Figure 3:
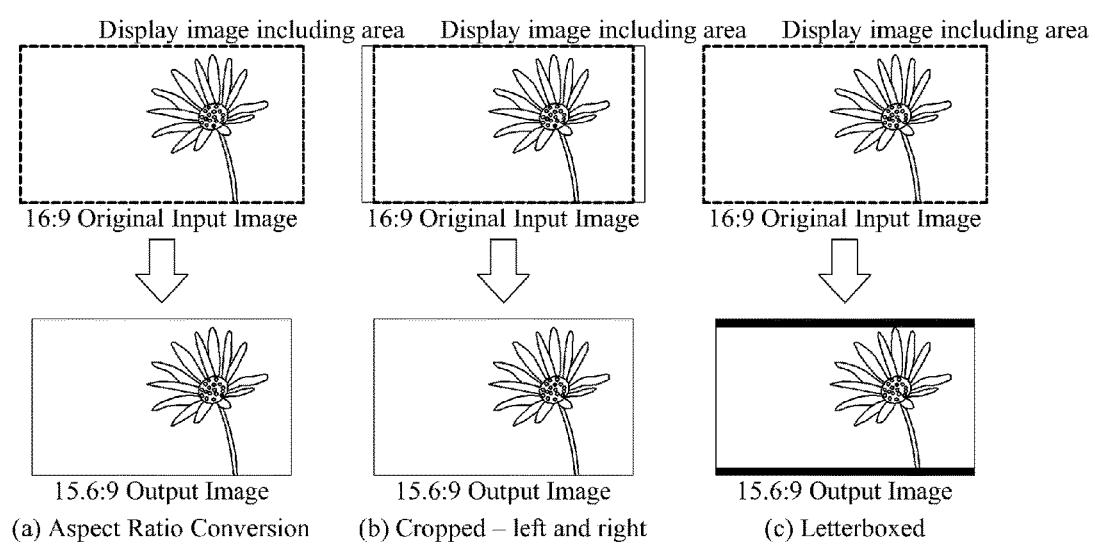
FIG. 3 illustrates a process of adjusting a second viewpoint image when a width of the second viewpoint image is lower in terms of ratio than a width of the first viewpoint image according to an embodiment.

FIG. 3 illustrates a process of adjusting a second viewpoint image when a width of the second viewpoint image is lower in terms of ratio than a width of the first viewpoint image according to an embodiment.

FIG. 3 shows that the second viewpoint image is adjusted when a transmission format having an aspect ratio which is lower in terms of width or higher in terms of height than the aspect ratio of the original second viewpoint image is used. For example, FIG. 3 illustrates that the original second viewpoint image having an aspect ratio of 16:9 is adjusted to match a transmission format with an aspect ratio of 15.6:9. Here, the first viewpoint image may correspond to a left image, and the second viewpoint image to a right image.

In one embodiment, in the adjusting process, when the aspect ratio of the left image relating to transmission format is different from the aspect ratio of the right image relating to transmission format, one of the viewpoint images is adjusted so as to compose the left and right images into a 3D image.

Alternatively, in the adjusting process, when the aspect ratio of the original image input before encoding the image is not supported by a broadcast network for transmitting an image stream as shown in FIG. 3, the original image may be subjected to aspect ratio conversion, cropping, pillarboxing or letterboxing to match an aspect ratio relating to transmission format supported by the network. If a standard of a main broadcast transmission format supports the aspect ratio of the original image, the 3D broadcast service providing apparatus may not need to adjust the aspect ratio of the original image. On the contrary, if a standard of a mobile broadcast transmission format does not support the aspect ratio of the original image, the 3D broadcast service providing apparatus may need to adjust the original image to match the standard of the mobile broadcast transmission format.

FIG. 3(a) illustrates a process of adjusting the original image by applying aspect ratio conversion to the original image. Aspect ratio conversion may refer to a process of converting the aspect ratio of the original image so that the transmission format with the aspect ratio of 15.6:9 may include the entire original image having the aspect ratio of 16:9. In this case, although the aspect ratio relating to transmission format is 15.6:9, an aspect ratio relating to display of the transmitted image may be the same as 16:9 of the original image.

FIG. 3(b) illustrates a process of adjusting the original right image by cropping the right image. In FIG. 3(b), the original image is adjusted to match a standard of the transmission format by cropping right and left portions of the original image.

FIG. 3(c) illustrates a process of changing the aspect ratio of the original image by applying letterboxing to the original image. In FIG. 3(c), the original image is adjusted to match the standard of the transmission format by adding letterboxing bars at a top and bottom of the original image.

Figure 4:
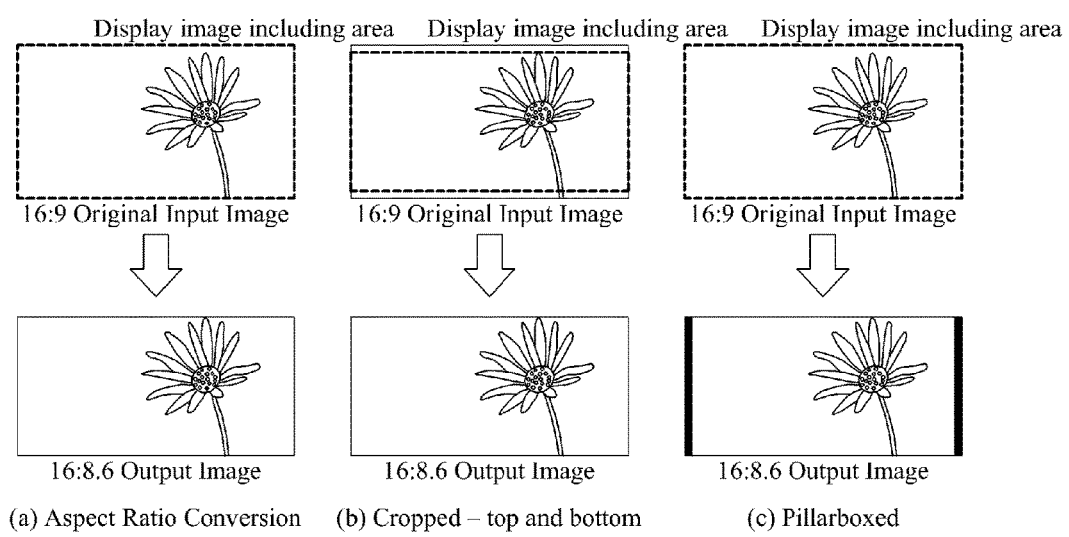
FIG. 4 illustrates a process of adjusting a second viewpoint image when a height of the second viewpoint image is lower in terms of ratio than a height of the first viewpoint image according to an embodiment.

FIG. 4 illustrates a process of adjusting a second viewpoint image when a height of the second viewpoint image is lower in terms of ratio than a height of the first viewpoint image according to an embodiment.

FIG. 4 shows that the second viewpoint image is adjusted when a transmission format having an aspect ratio which is lower in terms of height or higher in terms of width than the aspect ratio of the original second viewpoint image is used. For example, FIG. 4 illustrates that the original image having an aspect ratio of 16:9 is adjusted to match a transmission format with an aspect ratio of 16:8.9. Here, the second viewpoint image may correspond to a right image.

FIG. 4(a) illustrates a process of adjusting the original image by applying aspect ratio conversion to the original image. Aspect ratio conversion may refer to a process of converting the aspect ratio of the original image so that the transmission format with the aspect ratio of 15.6:9 may include the entire original image having the aspect ratio of 16:9. In this case, although the aspect ratio relating to transmission format is 16:8.9, an aspect ratio relating to display of the transmitted image may be the same as 16:9 of the original image.

FIG. 4(b) illustrates a process of adjusting the original right image by cropping the right image. In FIG. 4(b), the original image is adjusted to match a standard of the transmission format by cropping upper and lower portions of the original image.

FIG. 4(c) illustrates a process of changing the aspect ratio of the original image by applying pillarboxing to the original image. In FIG. 4(c), the original image is adjusted to match the standard of the transmission format by adding pillarboxing bars on right and left sides of the original image.

FIG. 5 illustrates an example of signaling aspect ratio adjustment information according to an embodiment.

Referring to FIG. 5, the aspect ratio adjustment information is illustrated in a descriptor form. In particular, the aspect ratio adjustment information may include an aspect ratio adjustment mode (aspect_ratio_adjustment_mode). Also, as described above, when the aspect ratio of the second viewpoint image is adjusted, the aspect ratio adjustment information may be signaled, being inserted into the broadcast stream of the first viewpoint image or the broadcast stream of the second viewpoint image. Particularly, when the aspect ratio adjustment information is expressed as descriptors as in FIG. 5, the aspect ratio adjustment information may be inserted into the broadcast stream of the first viewpoint image.

FIG. 6 illustrates an example of the aspect ratio adjustment information in detail according to an embodiment.

FIG. 6 shows a detailed mode of the aspect ratio adjustment information illustrated in FIG. 5.

'000' (None): Aspect adjustment information of "000" indicates that the aspect ratio of the second viewpoint image transmitted to the 3D broadcast service reproduction apparatus 102 is not changed. Alternatively, the aspect adjustment information of "000" may indicate that the aspect ratio of the second viewpoint image transmitted to the 3D broadcast service reproduction apparatus 102 is changed by aspect ratio conversion. Here, the second viewpoint image having the changed aspect ratio may include the entire original second viewpoint image before the aspect ratio is changed. That is, the aspect adjustment information of "000" may mean that the transmitted second viewpoint image includes an entire area of the original image and an active area is the entire image.

'001' (Cropped-left and right): Aspect adjustment information of "001" may mean the second viewpoint image transmitted to the 3D broadcast service reproduction apparatus 102 is changed to a form with an adjusted width from the original aspect ratio by cropping left and right portions of the image.

'010' (Cropped-top and bottom): Aspect adjustment information of "010" may mean the second viewpoint image transmitted to the 3D broadcast service reproduction apparatus 102 is changed to a form with an adjusted height from the original aspect ratio by cropping upper and lower portions of the image.

'011' (Letterboxed): Aspect adjustment information of "011" may mean the second viewpoint image transmitted to the 3D broadcast service reproduction apparatus 102 is changed to a form matching the standard of the transmission format of the broadcast network of the second viewpoint image by adding letterboxing bars to a top and bottom of the image. Here, an aspect ratio relating to display of an active area in the second viewpoint image may be the same the aspect ratio of the original second viewpoint image.

'100' (Pillarboxed): Aspect adjustment information of "100" may mean the second viewpoint image transmitted to the 3D broadcast service reproduction apparatus 102 is changed to a form matching the standard of the transmission format of the broadcast network of the second viewpoint image by adding pillarboxing bars on right and left sides of the image. Here, an aspect ratio relating to display of an active area in the second viewpoint image may be the same the aspect ratio of the original second viewpoint image.

Figure 7:
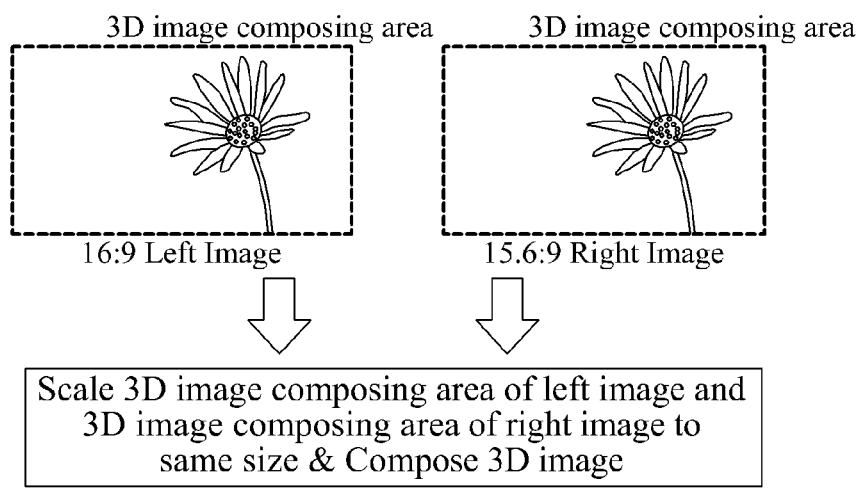
FIG. 7 illustrates a process that the 3D broadcast service reproduction apparatus composes viewpoint images with different aspect ratios when a width of a second viewpoint image is lower in terms of ratio than a width of a first viewpoint image according to an embodiment.

FIG. 7 illustrates a process that the 3D broadcast service reproduction apparatus composes viewpoint images with different aspect ratios when a width of a second viewpoint image is lower in terms of ratio than a width of a first viewpoint image according to an embodiment.

FIG. 7 illustrates the aspect ratio adjustment information of "000" in FIG. 6. That is, FIG. 7 illustrates that an aspect ratio of a right image as the second viewpoint image is adjusted by aspect ratio conversion, which may mean that the encoded right image includes the entire original image. In FIG. 7, the right image has the aspect ratio with a lower width in terms of ratio than that of the left image.

In FIG. 7, the 3D broadcast service reproduction apparatus may scale the first viewpoint image and the second viewpoint image to have the same size. Suppose that the left image as the first viewpoint image transmitted through a first broadcast network satisfying a first transmission format has a W×H size and the right image as the second viewpoint image transmitted through a second broadcast network satisfying a second transmission format has a w×h size, and a scaled display image has a dW×dH size. Here, d may be a scaling factor.

That is, it may be assumed that the left image may have the same aspect ratios relating to transmission format and to display. Further, it may be assumed that the right image may have different aspect ratios relating to transmission format and to display. Here, display may correspond to the display image that is a 3D broadcast image obtained by composing the left image and the right image.

The left image may be scaled from W×H to dW×dH, and the right image may be scaled from w×h to dW×dH.

That is, the left image may be scaled with the aspect ratio retained, whereas the right image may be scaled with the aspect ratio changed. Namely, the 3D broadcast service reproduction apparatus may scale the right image as the second viewpoint image, changing the aspect ratio of the right image to the same aspect ratio as that of the first viewpoint image.

Figure 8:
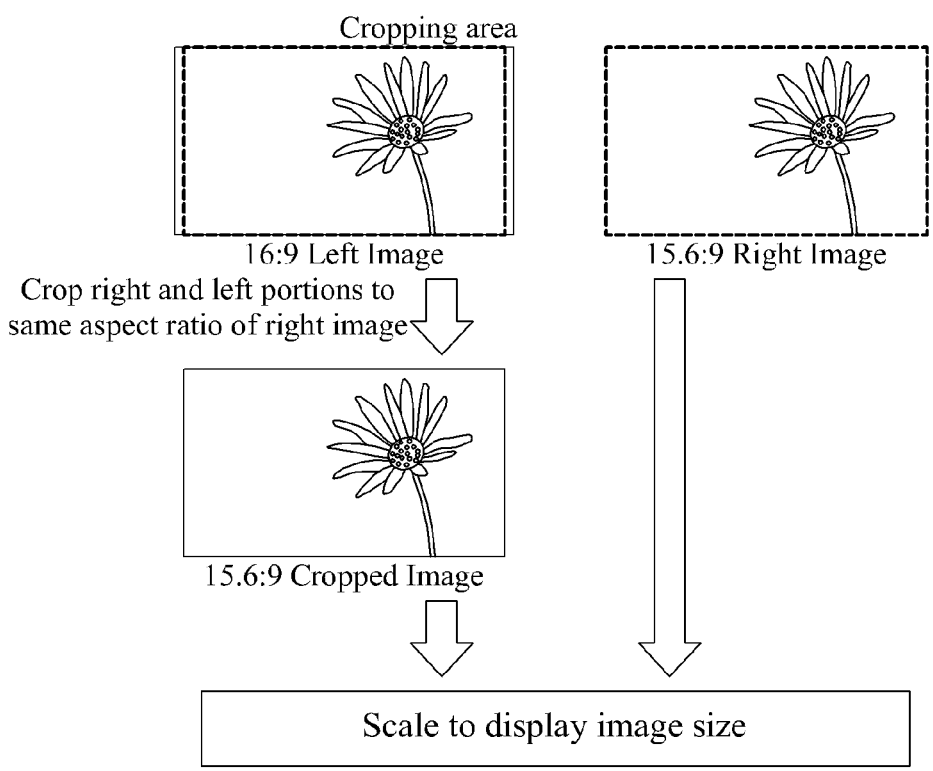
FIG. 8 illustrates a process that the 3D broadcast service reproduction apparatus composes a 3D image using a second viewpoint image cropped by the 3D broadcast service providing apparatus when a width of the second viewpoint image is lower in terms of ratio than a width of a first viewpoint image according to an embodiment.

FIG. 8 illustrates a process that the 3D broadcast service reproduction apparatus composes a 3D image using a second viewpoint image cropped by the 3D broadcast service providing apparatus when a width of the second viewpoint image is lower in terms of ratio than a width of a first viewpoint image according to an embodiment.

FIG. 8 illustrates the aspect ratio adjustment information of "001" in FIG. 6. That is, FIG. 8 illustrates that an aspect ratio of a right image as the second viewpoint image is adjusted by cropping right and left portions of the image.

In FIG. 8, the 3D broadcast service reproduction apparatus may scale the first viewpoint image and the second viewpoint image to have the same size. Suppose that the left image as the first viewpoint image transmitted through a first broadcast network satisfying a first transmission format has a W×H size and the right image as the second viewpoint image transmitted through a second broadcast network satisfying a second transmission format has a w×h size, and a scaled display image has a dW×dH size. Here, d may be a scaling factor.

The left image may be scaled to dW×dH after cropping right and left portions of the transmitted image by (W−H(w/h))/2 pixels, and the right image may be scaled from w×h to dW×dH.

That is, the 3D broadcast service reproduction apparatus may crop the right and left portions of the left image according to the aspect ratio of the right image and scale the cropped left image to the size of the display image. Further, the 3D broadcast service reproduction apparatus may scale the right image to the size of the display image.

Figure 9:
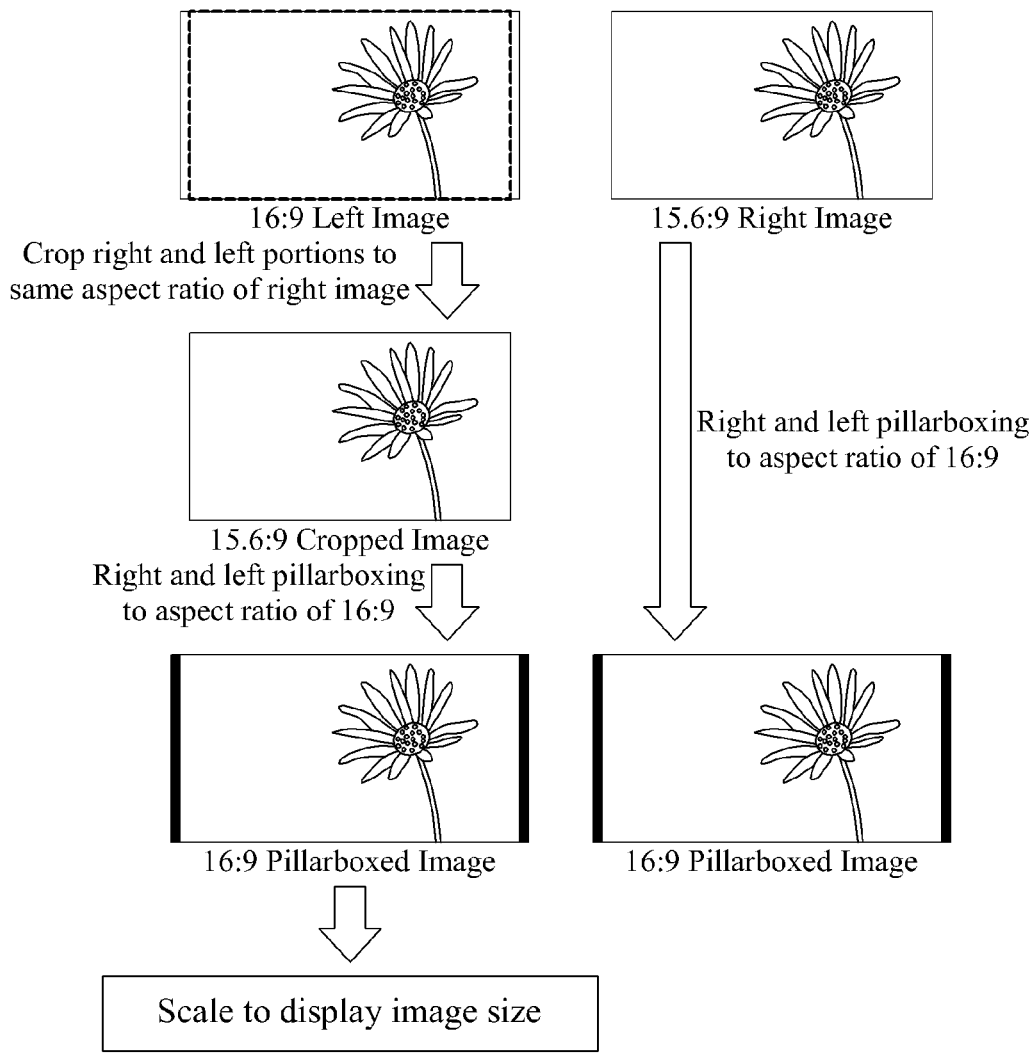
FIG. 9 illustrates a process that the 3D broadcast service reproduction apparatus composes a 3D image using a second viewpoint image cropped by the 3D broadcast service providing apparatus when a width of the second viewpoint image is lower in terms of ratio than a width of a first viewpoint image according to another embodiment.

FIG. 9 illustrates a process that the 3D broadcast service reproduction apparatus composes a 3D image using a second viewpoint image cropped by the 3D broadcast service providing apparatus when a width of the second viewpoint image is lower in terms of ratio than a width of a first viewpoint image according to another embodiment.

FIG. 9 illustrates the aspect ratio adjustment information of "001" in FIG. 6. That is, FIG. 9 illustrates that an aspect ratio of a right image as the second viewpoint image is adjusted by cropping right and left portions of the image.

In FIG. 9, the 3D broadcast service reproduction apparatus may scale the first viewpoint image and the second viewpoint image to have the same size. Suppose that the left image as the first viewpoint image transmitted through a first broadcast network satisfying a first transmission format has a W×H size and the right image as the second viewpoint image transmitted through a second broadcast network satisfying a second transmission format has a w×h size, and a scaled display image has a dW×dH size. Here, d may be a scaling factor.

The left image may be scaled to dW×dH after cropping right and left portions of the image by (W−H(w/h))/2 pixels and adding pillarboxing bars on right and left sides of the image by (W−H(w/h))/2 pixels. The right image may be scaled according to a height of the display image to dH(w/h)×dH. Subsequently, the right image may be scaled to dW×dH after adding pillarboxing bars by (dW−dH(w/h))/2 pixels.

That is, the 3D broadcast service reproduction apparatus may crop the right and left portions of the left image according to the aspect ratio of the right image, apply pillarboxing, and scale the left image to the display image. Further, the 3D broadcast service reproduction apparatus may scale the right image based on the height of the display image and apply pillarboxing to the right image to scale to the display image.

Figure 10:
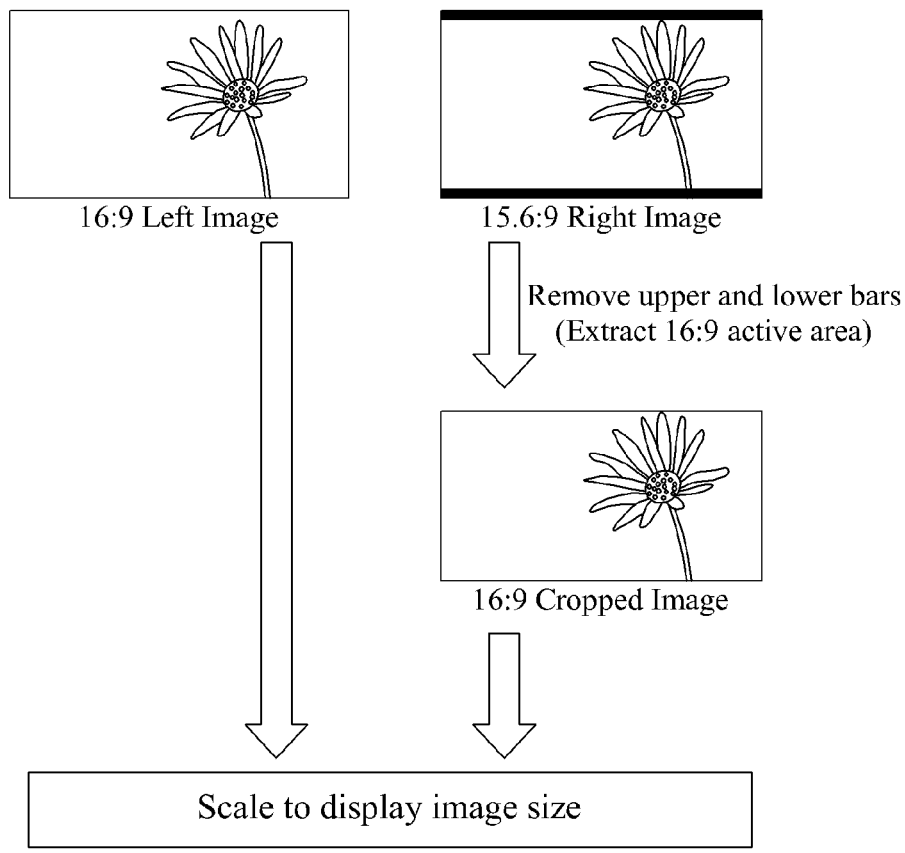
FIG. 10 illustrates a process that the 3D broadcast service reproduction apparatus composes a 3D image using a second viewpoint image letterboxed by the 3D broadcast service providing apparatus when a width of the second viewpoint image is lower in terms of ratio than a width of a first viewpoint image according to an embodiment.

FIG. 10 illustrates a process that the 3D broadcast service reproduction apparatus composes a 3D image using a second viewpoint image letterboxed by the 3D broadcast service providing apparatus when a width of the second viewpoint image is lower in terms of ratio than a width of a first viewpoint image according to an embodiment.

FIG. 10 illustrates the aspect ratio adjustment information of "011" in FIG. 6. That is, FIG. 10 illustrates that a right image as the second viewpoint image is adjusted by letterboxing.

In FIG. 10, the 3D broadcast service reproduction apparatus may scale the first viewpoint image and the second viewpoint image to have the same size. Suppose that the left image as the first viewpoint image transmitted through a first broadcast network satisfying a first transmission format has a W×H size and the right image as the second viewpoint image transmitted through a second broadcast network satisfying a second transmission format has a w×h size, and a scaled display image has a dW×dH size. Here, d may be a scaling factor.

That is, it may be assumed that the left image may have the same aspect ratios relating to transmission format and to display and the right image may have different aspect ratios relating to transmission format and to display.

Specifically, the left image may be scaled from W×H to dW×dH. The right image may be scaled to dW×dH via deriving an active area with an aspect ratio of 16:9 by removing upper and lower bars from the image and scaling the active area.

That is, the 3D broadcast service reproduction apparatus may scale the left image and the right image to the size of the display image. Then, the left image and the right image may be composed into a 3D image. The 3D broadcast service reproduction apparatus may scale the right image based on a width of the display image, crop upper and lower portions of the scaled image to derive an active area, and scale the active area to derive the display image.

Figure 11:
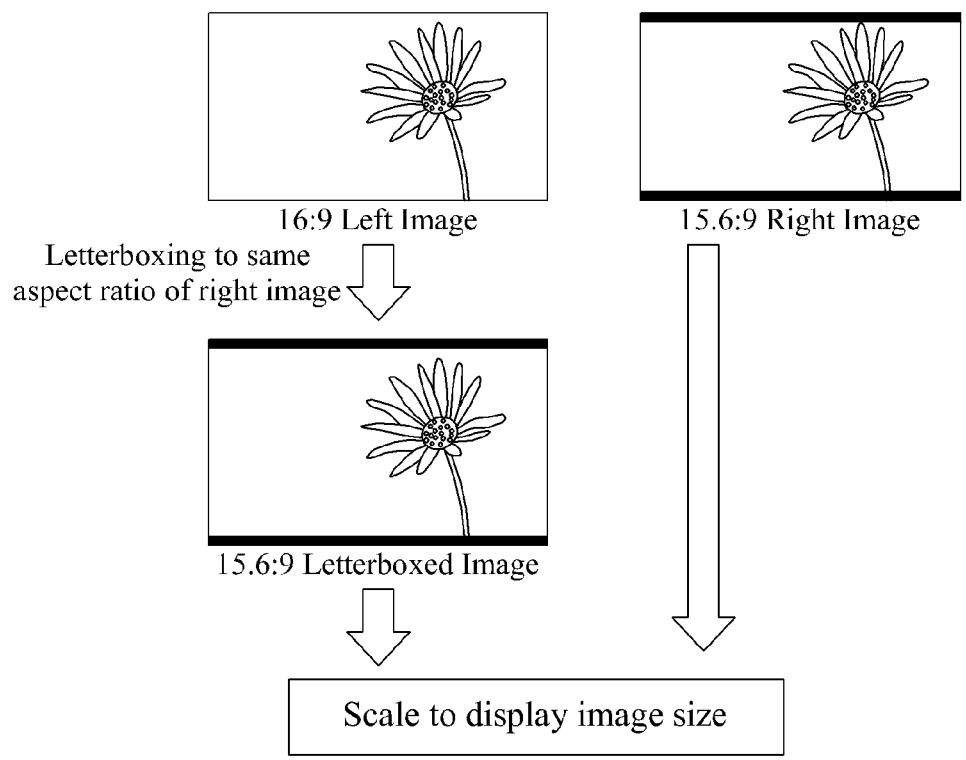
FIG. 11 illustrates a process that the 3D broadcast service reproduction apparatus composes a 3D image using a second viewpoint image letterboxed by the 3D broadcast service providing apparatus when a width of the second viewpoint image is lower in terms of ratio than a width of a first viewpoint image according to another embodiment.

FIG. 11 illustrates a process that the 3D broadcast service reproduction apparatus composes a 3D image using a second viewpoint image letterboxed by the 3D broadcast service providing apparatus when a width of the second viewpoint image is lower in terms of ratio than a width of a first viewpoint image according to another embodiment.

FIG. 11 illustrates the aspect ratio adjustment information of "011" in FIG. 6. That is, FIG. 11 illustrates that an aspect ratio of a right image as the second viewpoint image is adjusted by letterboxing.

In FIG. 11, the 3D broadcast service reproduction apparatus may scale the first viewpoint image and the second viewpoint image to have the same size. Suppose that the left image as the first viewpoint image transmitted through a first broadcast network satisfying a first transmission format has a W×H size and the right image as the second viewpoint image transmitted through a second broadcast network satisfying a second transmission format has a w×h size, and a scaled display image has a dW×dH size. Here, d may be a scaling factor.

The left image may be letterboxed by adding bars at a top and bottom of the image by (W(h/w)/H)/2 lines and scaled to dW×dH. The right image may be scaled from w×h to dW×dH.

That is, the 3D broadcast service reproduction apparatus may apply letterboxing to the left image according to the aspect ratio of the right image and scale the left image to the size of the display image. The 3D broadcast service reproduction apparatus may scale the right image to the size of the display image.

Figure 12:
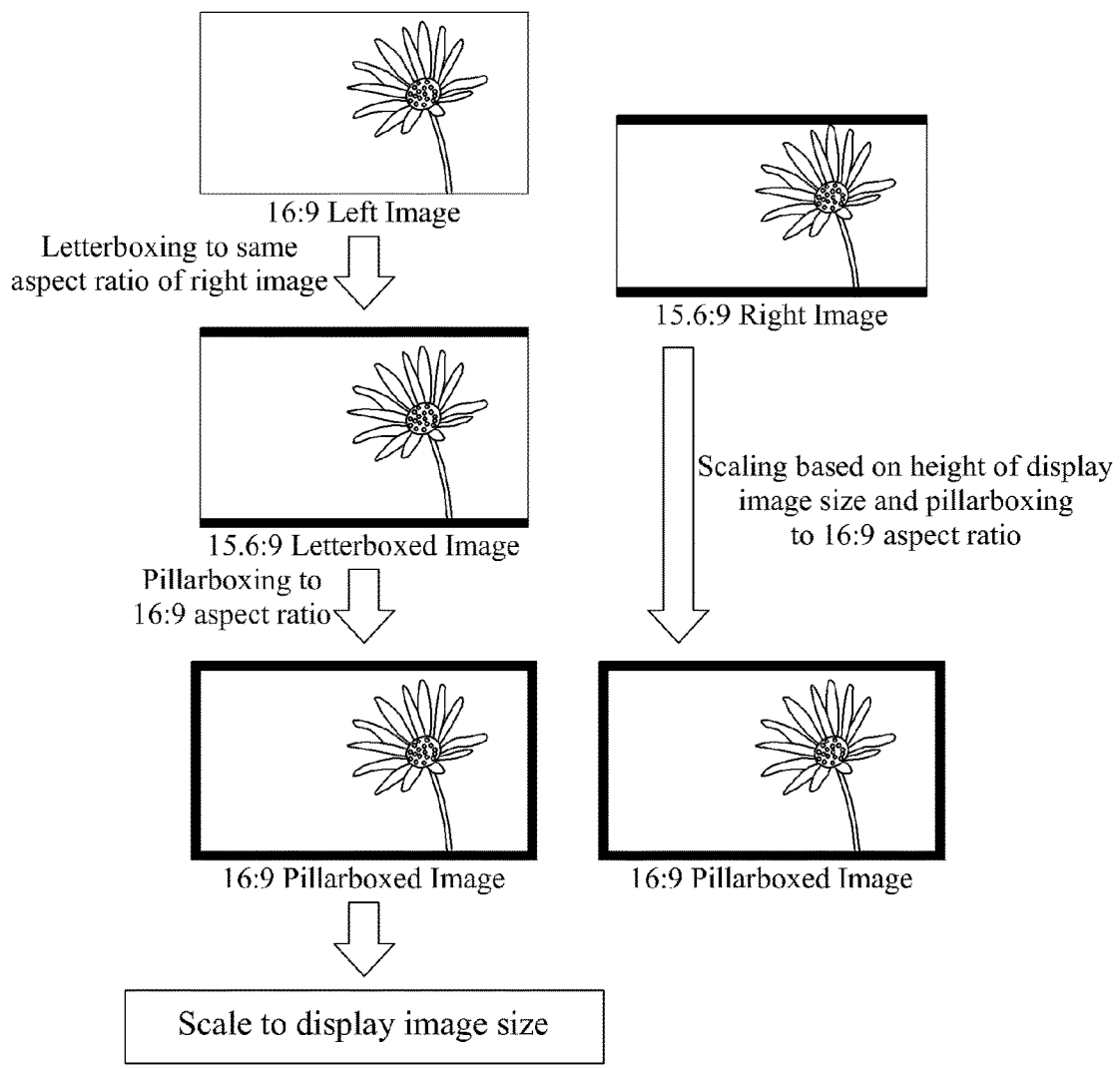
FIG. 12 illustrates a process that the 3D broadcast service reproduction apparatus composes a 3D image using a second viewpoint image letterboxed by the 3D broadcast service providing apparatus when a width of the second viewpoint image is lower in terms of ratio than a width of a first viewpoint image according to still another embodiment.

FIG. 12 illustrates a process that the 3D broadcast service reproduction apparatus composes a 3D image using a second viewpoint image letterboxed by the 3D broadcast service providing apparatus when a width of the second viewpoint image is lower in terms of ratio than a width of a first viewpoint image according to still another embodiment.

FIG. 12 illustrates the aspect ratio adjustment information of "011" in FIG. 6. That is, FIG. 12 illustrates that an aspect ratio of a right image as the second viewpoint image is adjusted by letterboxing.

In FIG. 12, the 3D broadcast service reproduction apparatus may scale the first viewpoint image and the second viewpoint image to have the same size. Suppose that the left image as the first viewpoint image transmitted through a first broadcast network satisfying a first transmission format has a W×H size and the right image as the second viewpoint image transmitted through a second broadcast network satisfying a second transmission format has a w×h size, and a scaled display image has a dW×dH size. Here, d may be a scaling factor.

The 3D broadcast service reproduction apparatus may apply letterboxing to the left image at a top and bottom of the image according to the aspect ratio of the right image, apply pillarboxing to the letterboxed left image on right and left sides of the image, and scale the image to the size of the display image. Further, the 3D broadcast service reproduction apparatus may scale the right image based on a height of the display image and apply pillarboxing to the scaled right image on right and left sides of the right image in view of an aspect ratio of the display image.

Figure 13:
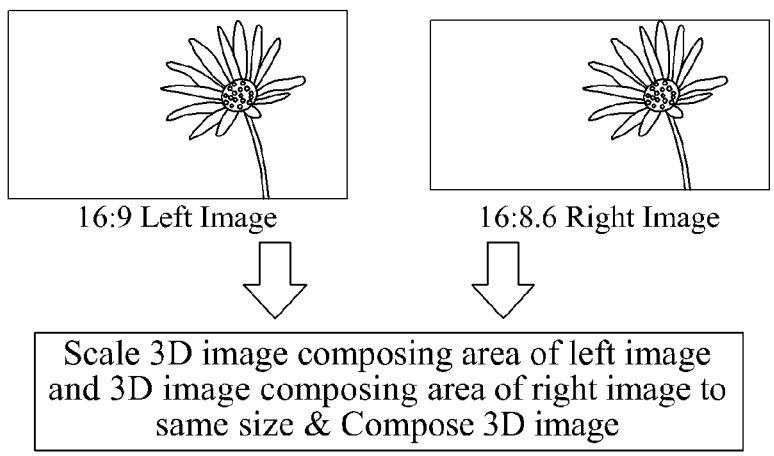
FIG. 13 illustrates a process that the 3D broadcast service reproduction apparatus composes viewpoint images with different aspect ratios when a height of a second viewpoint image is lower in terms of ratio than a height of a first viewpoint image according to an embodiment.

FIG. 13 illustrates a process that the 3D broadcast service reproduction apparatus composes viewpoint images with different aspect ratios when a height of a second viewpoint image is lower in terms of ratio than a height of a first viewpoint image according to an embodiment.

FIG. 13 illustrates the aspect ratio adjustment information of "000" in FIG. 6. That is, FIG. 13 illustrates that an aspect ratio of a right image as the second viewpoint image is adjusted by aspect ratio conversion, which may mean that the encoded right image includes the entire original image. In FIG. 13, the right image has the aspect ratio with a lower height in terms of ratio than that of the left image.

In FIG. 13, the 3D broadcast service reproduction apparatus may scale the first viewpoint image and the second viewpoint image to have the same size. Suppose that the left image as the first viewpoint image transmitted through a first broadcast network satisfying a first transmission format has a W×H size and the right image as the second viewpoint image transmitted through a second broadcast network satisfying a second transmission format has a w×h size, and a scaled display image has a dW×dH size. Here, d may be a scaling factor. That is, it may be assumed that the left image may have the same aspect ratios relating to transmission format and to display and the right image may have different aspect ratios relating to transmission format and to display.

The left image may be scaled from W×H to dW×dH, and the right image may be scaled from w×h to dW×dH. That is, the left image may be scaled with the aspect ratio retained, whereas the right image may be scaled with the aspect ratio changed. Namely, the 3D broadcast service reproduction apparatus may scale the right image as the second viewpoint image, changing the aspect ratio of the right image to the same aspect ratio as that of the first viewpoint image.

Figure 14:
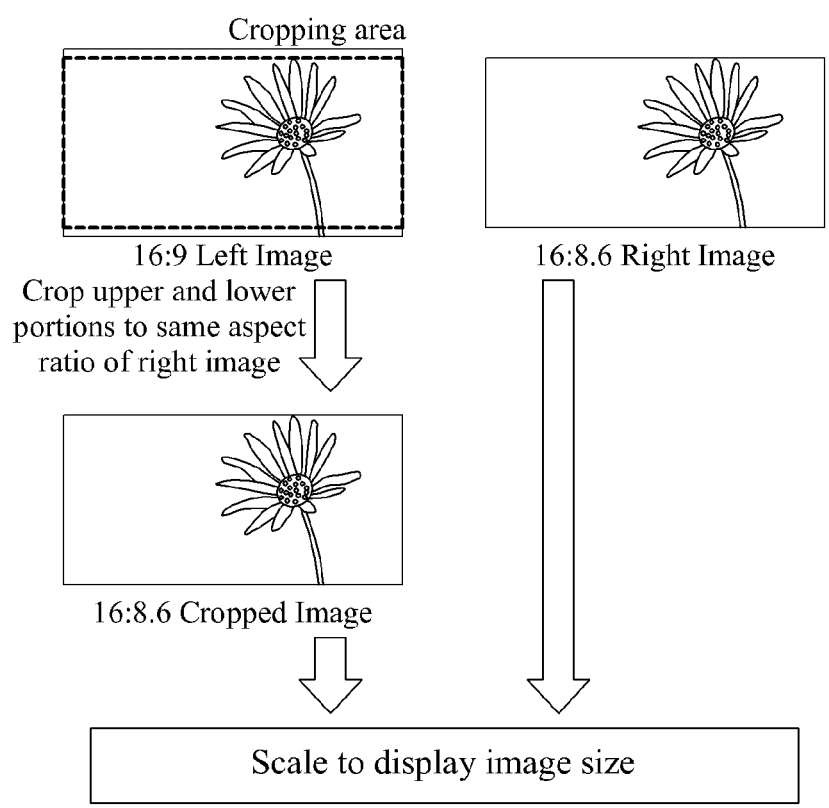
FIG. 14 illustrates a process that the 3D broadcast service reproduction apparatus composes a 3D image using a second viewpoint image cropped by the 3D broadcast service providing apparatus when a height of the second viewpoint image is lower in terms of ratio than a height of a first viewpoint image according to an embodiment.

FIG. 14 illustrates a process that the 3D broadcast service reproduction apparatus composes a 3D image using a second viewpoint image cropped by the 3D broadcast service providing apparatus when a height of the second viewpoint image is lower in terms of ratio than a height of a first viewpoint image according to an embodiment.

FIG. 14 illustrates the aspect ratio adjustment information of "010" in FIG. 6. That is, FIG. 8 illustrates that an aspect ratio of a right image as the second viewpoint image is adjusted by cropping upper and lower portions of the image.

In FIG. 14, the 3D broadcast service reproduction apparatus may scale the first viewpoint image and the second viewpoint image to have the same size. Suppose that the left image as the first viewpoint image transmitted through a first broadcast network satisfying a first transmission format has a W×H size and the right image as the second viewpoint image transmitted through a second broadcast network satisfying a second transmission format has a w×h size, and a scaled display image has a dW×dH size. Here, d may be a scaling factor.

The left image may be scaled to dW×dH after cropping upper and lower portions of the transmitted image by (H−W(h/w))/2 pixels, and the right image may be scaled from w×h to dW×dH. That is, the 3D broadcast service reproduction apparatus may crop the upper and lower portions of the left image according to the aspect ratio of the right image and scale the cropped left image to the display image. Further, the 3D broadcast service reproduction apparatus may scale the right image to the display image.

Figure 15:
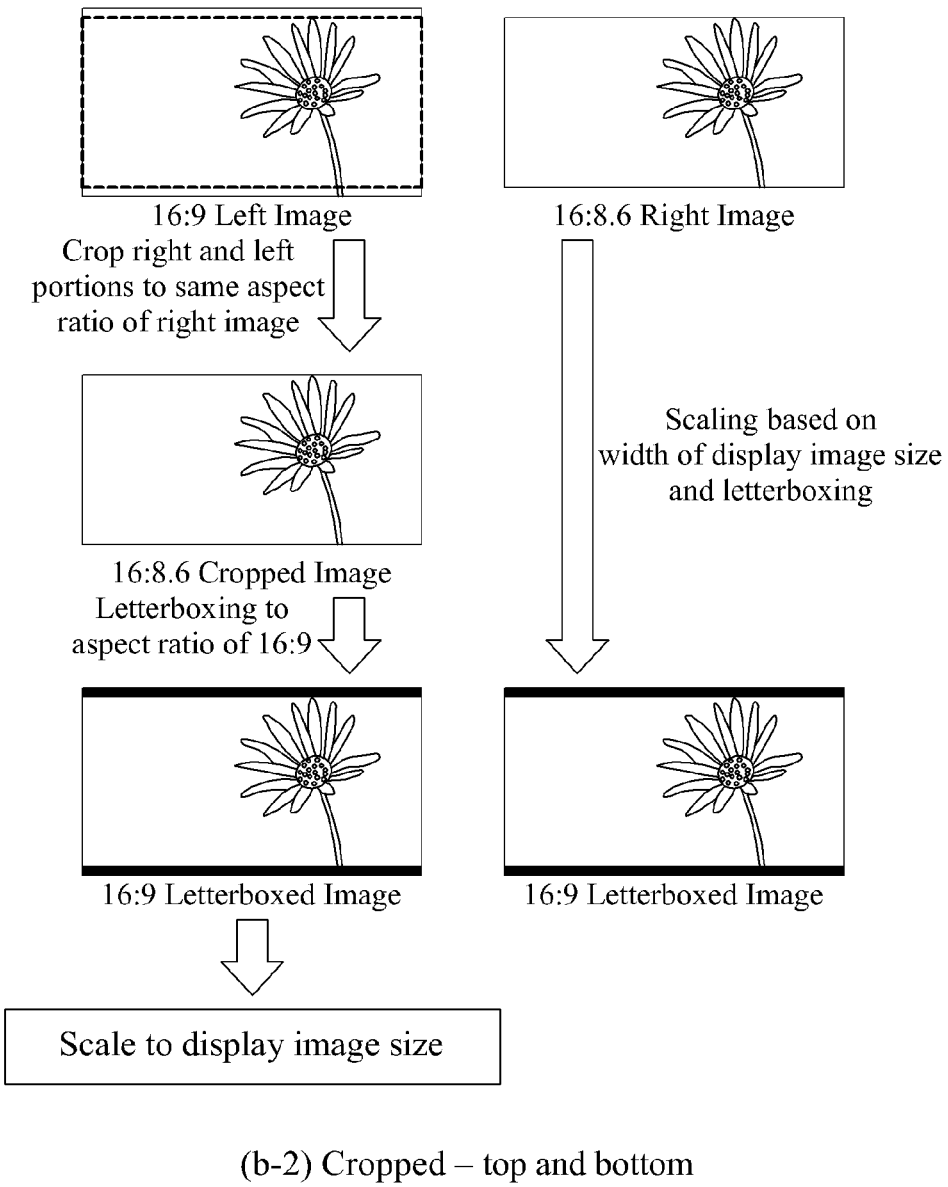
FIG. 15 illustrates a process that the 3D broadcast service reproduction apparatus composes a 3D image using a second viewpoint image cropped by the 3D broadcast service providing apparatus when a height of the second viewpoint image is lower in terms of ratio than a height of a first viewpoint image according to another embodiment.

FIG. 15 illustrates a process that the 3D broadcast service reproduction apparatus composes a 3D image using a second viewpoint image cropped by the 3D broadcast service providing apparatus when a height of the second viewpoint image is lower in terms of ratio than a height of a first viewpoint image according to another embodiment.

FIG. 15 illustrates the aspect ratio adjustment information of "010" in FIG. 6. That is, FIG. 15 illustrates that an aspect ratio of a right image as the second viewpoint image is adjusted by cropping upper and lower portions of the image.

In FIG. 15, the 3D broadcast service reproduction apparatus may scale the first viewpoint image and the second viewpoint image to have the same size. Suppose that the left image as the first viewpoint image transmitted through a first broadcast network satisfying a first transmission format has a W×H size and the right image as the second viewpoint image transmitted through a second broadcast network satisfying a second transmission format has a w×h size, and a scaled display image has a dW×dH size. Here, d may be a scaling factor.

The left image may be scaled to dW×dH after cropping upper and lower portions of the image by (H−W(h/w))/2 pixels and adding letterboxing bars at a top and bottom of the image by (H−W(h/w))/2 pixels. The right image may be scaled according to a width of the display image to dW×dW (h/w). Subsequently, the right image may be scaled to dW×dH after adding letterboxing bars by (dH−dW(h/w))/2 pixels. That is, the 3D broadcast service reproduction apparatus may crop the upper and lower portions of the left image according to the aspect ratio of the right image, apply letterboxing, and scale the left image to the display image. Further, the 3D broadcast service reproduction apparatus may scale the right image based on the width of the display image and apply letterboxing to the right image to scale to the display image.

Figure 16:
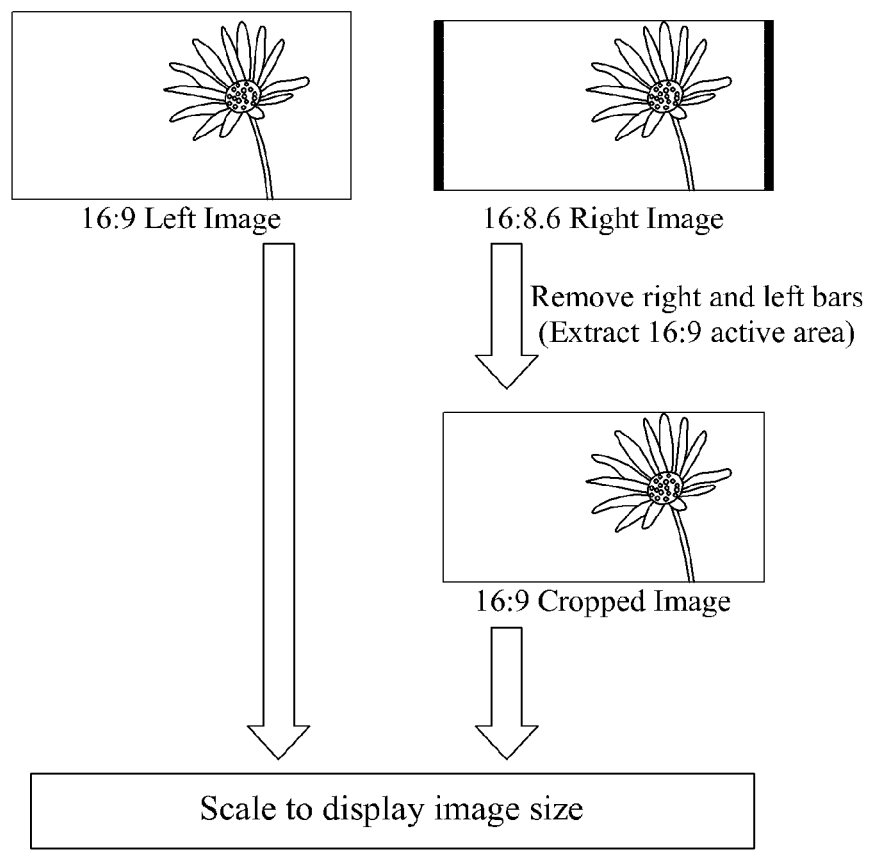
FIG. 16 illustrates a process that the 3D broadcast service reproduction apparatus composes a 3D image using a second viewpoint image letterboxed by the 3D broadcast service providing apparatus when a height of the second viewpoint image is lower in terms of ratio than a height of a first viewpoint image according to an embodiment.

FIG. 16 illustrates a process that the 3D broadcast service reproduction apparatus composes a 3D image using a second viewpoint image letterboxed by the 3D broadcast service providing apparatus when a height of the second viewpoint image is lower in terms of ratio than a height of a first viewpoint image according to an embodiment.

FIG. 16 illustrates the aspect ratio adjustment information of "100" in FIG. 6. That is, FIG. 16 illustrates that a right image as the second viewpoint image is adjusted by applying pillarboxing to the right image on right and left sides of the image.

In FIG. 16, the 3D broadcast service reproduction apparatus may scale the first viewpoint image and the second viewpoint image to have the same size. Suppose that the left image as the first viewpoint image transmitted through a first broadcast network satisfying a first transmission format has a W×H size and the right image as the second viewpoint image transmitted through a second broadcast network satisfying a second transmission format has a w×h size, and a scaled display image has a dW×dH size. Here, d may be a scaling factor.

That is, it may be assumed that the left image may have the same aspect ratios relating to transmission format and to display and the right image may have different aspect ratios relating to transmission format and to display.

Specifically, the left image may be scaled from W×H to dW×dH. The right image may be scaled to dW×dH via deriving an active area with an aspect ratio of 16:9 by removing right and left bars from the image and scaling the active area. That is, the 3D broadcast service reproduction apparatus may scale the left image to the size of the display image. Also, the 3D broadcast service reproduction apparatus may derive the active area by cropping right and left sides of the transmitted image and scale the active area to derive the display image.

Figure 17:
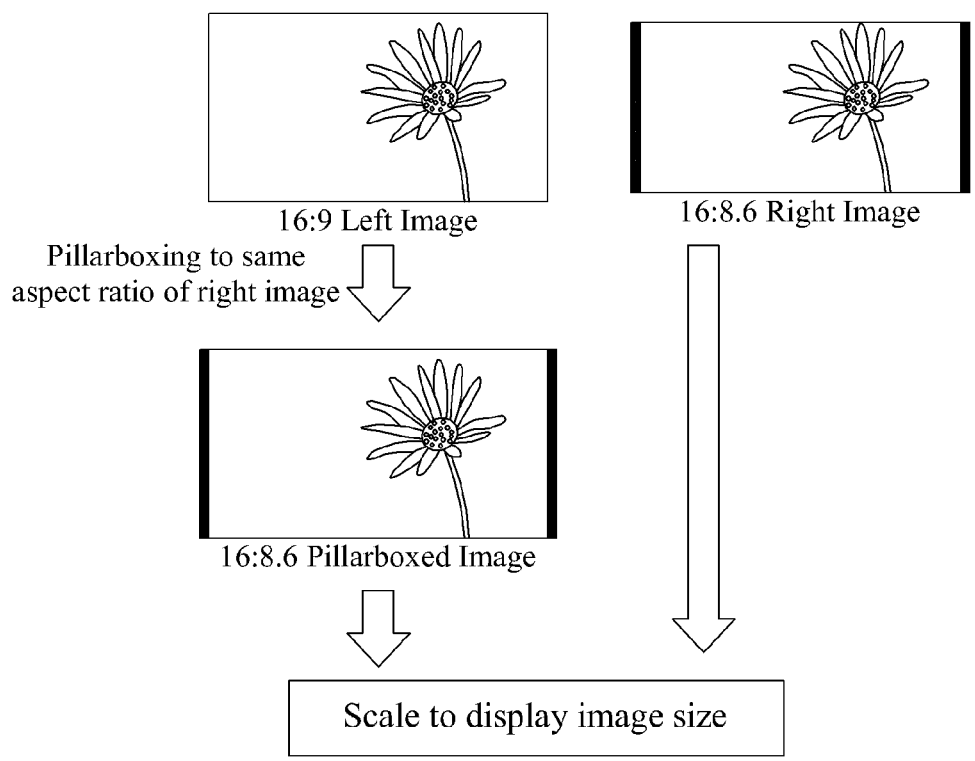
FIG. 17 illustrates a process that the 3D broadcast service reproduction apparatus composes a 3D image using a second viewpoint image letterboxed by the 3D broadcast service providing apparatus when a height of the second viewpoint image is lower in terms of ratio than a height of a first viewpoint image according to another embodiment.

FIG. 17 illustrates a process that the 3D broadcast service reproduction apparatus composes a 3D image using a second viewpoint image letterboxed by the 3D broadcast service providing apparatus when a height of the second viewpoint image is lower in terms of ratio than a height of a first viewpoint image according to another embodiment.

In FIG. 17, the 3D broadcast service reproduction apparatus may scale the first viewpoint image and the second viewpoint image to have the same size. Suppose that the left image as the first viewpoint image transmitted through a first broadcast network satisfying a first transmission format has a W×H size and the right image as the second viewpoint image transmitted through a second broadcast network satisfying a second transmission format has a w×h size, and a scaled display image has a dW×dH size. Here, d may be a scaling factor.

The left image may be pillarboxed by adding bars on right and left sides of the image by (H(w/h)/W)/2 lines and scaled to dW×dH. The right image may be scaled from w×h to dW×dH.

That is, the 3D broadcast service reproduction apparatus may apply pillarboxing to the left image according to an aspect ratio of the right image and scale the left image to the size of the display image. The 3D broadcast service reproduction apparatus may scale the right image to the size of the display image.

Figure 18:
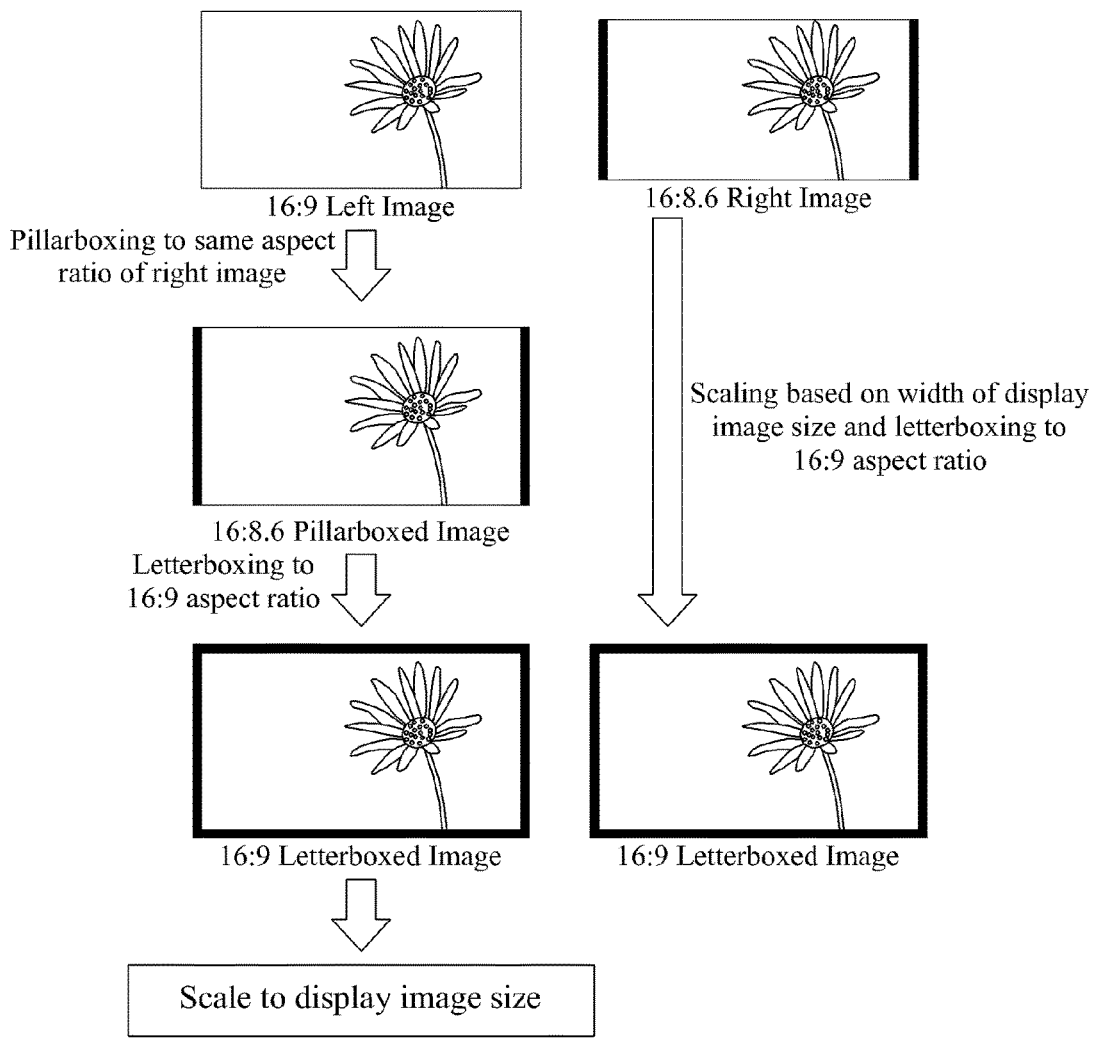
FIG. 18 illustrates a process that the 3D broadcast service reproduction apparatus composes a 3D image using a second viewpoint image letterboxed by the 3D broadcast service providing apparatus when a height of the second viewpoint image is lower in terms of ratio than a height of a first viewpoint image according to still another embodiment.

FIG. 18 illustrates a process that the 3D broadcast service reproduction apparatus composes a 3D image using a second viewpoint image letterboxed by the 3D broadcast service providing apparatus when a height of the second viewpoint image is lower in terms of ratio than a height of a first viewpoint image according to still another embodiment.

FIG. 18 illustrates the aspect ratio adjustment information of "100" in FIG. 6. That is, FIG. 18 illustrates that an aspect of a right image as the second viewpoint image is adjusted by applying pillarboxing to the right image on right and left sides of the image.

In FIG. 18, the 3D broadcast service reproduction apparatus may scale the first viewpoint image and the second viewpoint image to have the same size. Suppose that the left image as the first viewpoint image transmitted through a first broadcast network satisfying a first transmission format has a W×H size and the right image as the second viewpoint image transmitted through a second broadcast network satisfying a second transmission format has a w×h size, and a scaled display image has a dW×dH size. Here, d may be a scaling factor.

The left image may be scaled to the size of the display image after adding pillarboxing bars on right and left sides of the image according to the aspect ratio of the right image and adding letterboxing bars at a top and bottom of the image. The right image may be scaled based on a width of the display image and letterboxed by adding bars at a top and bottom of the image.

FIG. 19 illustrates an example of adjusting a second viewpoint image for a 3D broadcast service according to an embodiment.

An aspect ratio of a left image as a first viewpoint image used in a standard of a transmission format of an ATSC main service may be slightly different from an aspect ratio of a right image as the second viewpoint image used in a standard of a transmission format of an ATSC mobile service, as stipulated in A/153. Thus, the aspect ratio of the right image input for mobile broadcasting may need adjusting before encoding for 3D broadcasting.

For example, when an aspect ratio of the right image relating to transmission format is not exactly 16:9, the 3D broadcast service providing apparatus may apply letterboxing or pillarboxing to the right image before encoding the right image by AVC, thereby changing the aspect ratio of the right image to the aspect ratio relating to transmission format. In this case, presence of letterboxing bars or pillarboxing bars applied to the right image may be signaled through AFD or bar data information. Here, aspect ratio adjustment information of FIG. 5 may be omitted.

To generate a 3D broadcast image by combining the left image and the right image having the slight different aspect ratios relating to transmission format, the 3D broadcast service reproduction apparatus may need to adjust the aspect ratios of the right and left images to the same aspect ratio relating to display before composing the right and left images. First and second lines of FIG. 19 show how the 3D broadcast service providing apparatus adjusts the aspect ratio of the right image corresponding to MDTV according to a size of the right image.

Third and fourth lines of FIG. 19 show how the 3D broadcast service reproduction apparatus adjusts the aspect ratio of the right image transmitted from the 3D broadcast service providing apparatus before composing the right image corresponding to the main service and the left image. Here, it may be assumed that for a hybrid 3D broadcast service, a size of the left image applied to the ATSC main service may be the same as a display size of the 3D broadcast image actually displayed. If the display size of the 3D broadcast image is different from the size of the left image applied to the ATSC main service, an additional process of scaling the left image may be carried out so that the size of the left image matches the display size. Here, the right image may be scaled to the display size, not to the same size of the left image.

In particular, when the right image corresponding to the mobile service is encoded, a macroblock with a particular size, for example 16×16, may be generally used by a used video codec, for example, AVC. Then, in the mobile service, the right image may have an aspect ratio close to 16:9, for example 416×240 and 15.6:9, instead of exact 16:9. In this case, aspect ratio change information indicating by which method the aspect ratio of the right image is converted to derive the right image from an original image with an aspect ratio of 16:9 may be signaled. The right image may need processing based on the aspect ratio change information and composing with the left image to reconstruct the 3D broadcast image.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The method according to the above-described embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of providing a three-dimensional (3D) broadcast service, the method comprising:
    adjusting an aspect ratio of a second viewpoint image for mobile broadcast using letterboxing or pillarboxing so that the second viewpoint image has a same aspect ratio as that of a first viewpoint image with respect to an active area, when the aspect ratios of the first viewpoint image and the second viewpoint image are not identical;
    encoding the first viewpoint image and the adjusted second viewpoint image for 3D broadcasting; and
    generating an Active Format Description (AFD) for bar data to indicate presence of a bar related to a letterbox or a pillarbox used for adjusting the aspect ratio of the second viewpoint image,
    wherein the first viewpoint image is transmitted using a main service, and the second viewpoint image is transmitted using a mobile service,
    wherein the aspect ratio of the first viewpoint image for a transmission format of the main service is same as an aspect ratio of a display for reproducing a 3D broadcast image obtained by composing the first viewpoint image and the second viewpoint image,
    wherein a size of the first viewpoint image for the main service is larger than a size of the second viewpoint image for the mobile service, and is same as a size of the display,
    wherein the adjusting comprising:
        scaling the size of the second view point image so that the aspect ratio thereof is the same as that of the first viewpoint image, and
        applying the bar related to the letterbox or the pillarbox to the scaled second viewpoint image, and
    wherein the active area of the second viewpoint image is extracted, and the extracted active area is subsequently scaled to the size of the display, before composing the first viewpoint image and the second viewpoint image for obtaining the 3D broadcast image and presenting the 3D broadcast image through the display.

2. The method of claim 1, further comprising inserting aspect ratio adjustment information used for adjusting the second viewpoint image into the broadcast stream of the first viewpoint image or the broadcast stream of the second viewpoint image.

3. The method of claim 1, wherein the adjusting adjusts the second viewpoint image by applying aspect ratio conversion to the second viewpoint image.

4. The method of claim 1, wherein the adjusting adjusts the second viewpoint image by applying cropping to the second viewpoint image.

5. The method of claim 1, wherein the adjusting adjusts the second viewpoint image by applying letterboxing to the second viewpoint image.

6. The method of claim 1, wherein the adjusting adjusts the second viewpoint image by applying pillarboxing to the second viewpoint image.

7. A method of providing a three-dimensional (3D) broadcast service, the method comprising:
    adjusting an spect ratio of a second viewpoint image for mobile broadcast using letterboxing or pillarboxing so that the second viewpoint image has a same aspect ratio as that of a first viewpoint image with respect to an active area, when the aspect ratios of the first viewpoint image and the second viewpoint image are not identical;

encoding the first viewpoint image and the adjusted second viewpoint image;

transmitting the first viewpoint image using a main broadcast and the second viewpoint image using the mobile broadcast; and transmitting an Active Format Description (AFD) for bar data to indicate presence of a bar related to a letterbox or a pillarbox used for adjusting the aspect ratio of the second viewpoint image, wherein the first viewpoint image is transmitted using a main service, and the second viewpoint image is transmitted using a mobile service, wherein the first viewpoint image and the second viewpoint image are transmitted via different streams, wherein the aspect ratio of the first viewpoint image for a transmission format of the main service is same as an aspect ratio of a display for reproducing a 3D broadcast image obtained by composing the first viewpoint image and the second viewpoint image, wherein a size of the first viewpoint image for the main service is larger than a size of the second viewpoint image for the mobile service, and is same as a size of the display, wherein the adjusting comprising:
  scaling the size of the second view point image so that the aspect ratio thereof is the same as that of the first viewpoint image, and
  applying the bar related to the letterbox or the pillarbox to the scaled second viewpoint image, and wherein the active area of the second viewpoint image is extracted, and the extracted active area is subsequently scaled to the size of the display, before composing the first viewpoint image and the second viewpoint image for obtaining the 3D broadcast image and presenting the 3D broadcast image through the display.

8. The method of claim 7, wherein the adjusting adjusts the second viewpoint image by applying cropping to the second viewpoint image.

9. The method of claim 7, wherein the adjusting adjusts the second viewpoint image by applying letterboxing to the second viewpoint image.

10. The method of claim 7, wherein the adjusting adjusts the second viewpoint image by applying pillarboxing to the second viewpoint image.

11. A method of reproducing a three-dimensional (3D) broadcast service, the method comprising:

receiving a first broadcast stream of a first viewpoint image for a main broadcast and a second broadcast stream of a second viewpoint image for a mobile broadcast;

decoding the first viewpoint image and the second viewpoint image;

adjusting an aspect ratio of the second viewpoint image to create a 3D image using an Active Format Description (AFD) for bar data to indicate presence of a bar related to a letterbox or a pillarbox, when an aspect ratio of the first viewpoint image and the aspect ratio of the second viewpoint image are not identical; and composing the first viewpoint image and the second viewpoint image to generate a 3D broadcast image, wherein the first viewpoint image is transmitted using a main service, and the second viewpoint image is transmitted using a mobile service, wherein the first and second broadcast streams are transmitted via different streams, wherein the aspect ratio of the first viewpoint image for a transmission format of the main service is same as an aspect ratio of a display for reproducing a 3D broadcast image obtained by composing the first viewpoint image and the second viewpoint image, wherein a size of the first viewpoint image for the main service is larger than a size of the second viewpoint image for the mobile service, and is same as a size of the display, wherein the adjusting comprising:
  scaling the size of the second view point image so that the aspect ratio thereof is the same as that of the first viewpoint image, and
  applying the bar related to the letterbox or the pillarbox to the scaled second viewpoint image, and wherein an active area of the second viewpoint image is extracted, and the extracted active area is subsequently scaled to the size of the display, before composing the first viewpoint image and the second viewpoint image for obtaining the 3D broadcast image and presenting the 3D broadcast image through the display.

12. The method of claim 11, wherein the adjusting adjusts the second viewpoint image by applying aspect ratio conversion to the second viewpoint image.

13. The method of claim 11, wherein the adjusting applies cropping to the first viewpoint image to match the second viewpoint image.

14. The method of claim 11, wherein the adjusting adjusts the second viewpoint image by removing a letterboxing bar from the second viewpoint image.

15. The method of claim 11, wherein the adjusting adjusts the second viewpoint image by removing a pillarboxing bar from the second viewpoint image.

* * * * *